United States Patent [19]

Hermle

[11] 4,207,507

[45] Jun. 10, 1980

[54] ELECTRONIC CONTROLLER

[76] Inventor: Eduard Hermle, Kirchstrasse 20D, 7303 Neuhausen a.d.F., Fed. Rep. of Germany

[21] Appl. No.: 896,609

[22] Filed: Apr. 14, 1978

[30] Foreign Application Priority Data

Apr. 19, 1977 [DE] Fed. Rep. of Germany ....... 2717178

[51] Int. Cl.² ............................................... G05B 1/06
[52] U.S. Cl. ...................................... 318/665; 318/663
[58] Field of Search ......................... 318/665, 663, 664

[56] References Cited

U.S. PATENT DOCUMENTS

| | | | |
|---|---|---|---|
| 3,668,503 | 6/1972 | Lindner | 318/665 |
| 4,117,386 | 9/1968 | Cohen et al. | 318/665 X |

*Primary Examiner*—B. Dobeck

*Attorney, Agent, or Firm*—Neuman, Williams, Anderson & Olson

[57] ABSTRACT

A signal generator for producing a control signal to control specific operations based upon the angular position of a rotating part in devices such as molding presses. An electrical signal related to the position of the rotating part is generated by using a potentiometer. The signal from the potentiometer is compared in a logic circuit to other adjustable electrical signals. Based upon the results of the comparison a control circuit provides the control signal. Furthermore, monitoring circuits are provided to detect any improper deviation in the electrical signals and upon detecting a deviation in an electrical signal the monitoring circuit provides an error output signal. An interrupter circuit is responsive to each monitoring device and disables the motion of the rotating part upon receipt of any error signal.

28 Claims, 7 Drawing Figures

ELECTRONIC CONTROLLER

The invention relates to an electronic controller for generating electric control signals for specific angular positions of continuously rotating parts with a rotary potentiometer which is actuated by the rotating parts and delivers a measuring voltage which rises in proportion with the rotation of the potentiometer tapping and drops back to zero when a full rotation is reached and can be compared with adjustable make and break voltages to define the make and break point of the control signals.

Known controllers on devices with rotating parts, for example blanking or moulding presses, produce signals for the in-phase switching on and switching off of specific operations by mechanical means, using disc cams which are non-rotationally coupled to the rotating parts and adapted in the course of their rotation to actuate corresponding cam switches. In devices of this kind it is difficult to alter the make timing because to this end the disc cams would have to be rotated on the rotating parts or would have to be completely exchanged. Moreover, owing to the inertia of the mechanical parts delays occur in switching at high rotational speeds.

It would therefore be desirable for the control signals to be generated by electrical means. The measuring transducers, i.e. devices which deliver a voltage proportional to the angular position of the rotating part, used hitherto to this end are constructed, for example, as resolvers or as encoders; in each case these represent complex and expensive devices.

In this connection it would be substantially more convenient to use potentiometers which are rotated by the rotating parts; however, the use of such components was hitherto found to be impossible because of the poor definition in the transition region of the voltage tapped off between the beginning and end of the resistor track by the passage of the wiper arm thereover. Furthermore, difficulties occur if it is necessary to generate a control signal whose make point is situated at the end of the resistor track but whose break point is situated at the beginning of the resistor track. In this case it was hitherto necessary to generate two separate control signals, namely a first signal from the make time to the end of the resistor track and a second signal from the beginning of the resistor track to the break time.

As a result of these disadvantages inexpensive rotary potentiometers have not hitherto been used to generate control signals which are dependent on angular deflection.

It is the object of the invention to improve an electronic controller of the kind described hereinbefore so that precise generation of control signals is made possible even over the step response range of the rotary potentiometer despite the use of rotary potentiometers.

In apparatus of the kind described hereinbefore this problem is solved in accordance with the invention in that there is provided a first comparator for comparing the measuring voltage with the make voltage, by the provision of a third comparator for comparing the measuring voltage and the break voltage and by the provision of a second comparator for comparing the make voltage and the break voltage and that the outputs of the three comparators are connected to a logic circuit so that a control signal is switched on whenever the measuring voltage reaches the make voltage and is switched off whenever the measuring voltage reaches the break voltage.

The system can be arranged so that an EXCLUSIVE-OR-element, one of whose inputs in connected directly to the output of the first comparator and whose second input is connected to a logic switching unit which leaves the output signal of the third comparator unchanged if the make voltage is smaller than the break voltage but inverts the output signal of the third comparator if the make voltage is greater than the break voltage.

With a controller embodied in accordance with the invention it is possible to generate uninterrupted control signals from the selected make time to the selected break time even if the selected break voltage is less than the selected make voltage i.e. if the make time of the control signal extends from maximum to zero over the step in the measuring voltage which is tapped off from the rotary potentiometer.

Within the scope of this invention it is particularly advantageous that the rotary potentiometer is provided with two wiper arms set at a fixed angular spacing from each other, and changeover means which picks off an output voltage from the front wiper arm for as long as this is situated at a distance at 360°/0° from the full angle of rotation of the potentiometer and forms an output voltage from the voltage of the rear wiper arm by adding thereto a supplementary voltage corresponding to the voltage between the two wiper arms as soon as the front wiper arm is situated in the region of the full angle of rotation and to produce the measuring voltage subtracts from the output voltage thus obtained a voltage which corresponds to the voltage on the front wiper arm in the position in which the switching means switch back from the rear to the front wiper arm.

According to another advantageous embodiment of the invention it is possible to arrange that the rotary potentiometer has a first fixed voltage tapping for the supplementary voltage, a second fixed voltage tapping at an angle of rotation situated in front of the full angle of rotation of 360° slightly more than corresponding to the angle between the two wiper arms and has a third fixed voltage tapping situated directly in front of the full angle of rotation of 360° and that switching from the front to the rear wiper arm is performed for as long as the voltage on the rear wiper arm is between the voltages on the second and third voltage tapping.

Such rotary potentiometers have already been proposed and the present invention provides a particularly advantageous use of this type of rotary potentiometer.

To permit reliable operation of the electronic controller to be monitored the system can be arranged so that there is provided a monitoring circuit with a summing circuit for the voltage of the first fixed tapping, for the voltage between the front and rear wiper arm and for the voltage between the second and third fixed tapping as well as a window discriminator to detect any deviation of the sum of the said voltages from a fixed voltage value, the monitoring circuit generating an error signal in the event of a defined deviation of the summated voltage value from the fixed voltage value and a selector circuit is connected to the output of the window discriminator to suppress the error signal for as long as the switching means take off the output voltage from the rear wiper arm. This monitoring circuit monitors the operation of the rotary potentiometer only over the region in which the front wiper arm supplies the output voltage.

To monitor the operation of the rotary potentiometer over the remaining range it is possible to provide a comparator one input of which is supplied with the measuring voltage of the potentiometer and whose other input is supplied with the voltage of the second fixed tapping. This monitoring circuit can generate an error signal if the measured voltage of the potentiometer is below the voltage of the second fixed tapping. To ensure that such a monitoring circuit comes into operation only over the range which is not monitored by the above-described monitoring circuit the comparator can be followed by a selector circuit which suppresses the error signal for as long as the output voltage is picked off from the front wiper arm.

To improve reliability the monitoring circuit can be constructed in duplex form and generate an error signal in the event of any deviation of its error signal display.

To monitor the mechanical connection between the rotating part and the potentiometer it is possible to provide a comparator circuit which is supplied with at least one counting pulse by the potentiometer for each rotation thereof and is supplied by a pulse transmitter associated with the rotating part with an equal number of reset pulses for each rotation of said pulse transmitter. The comparator circuit generates an error signal in the event of any deviation between the number of counting and reset pulses during one rotation.

Finally, to monitor the connections which transmit the potentiometer measuring voltages to the control circuits, a fixed voltage can be superimposed on the measured potentiometer voltage. The control circuit is then associated with a detector circuit which generates an error signal if the fixed voltage is absent.

All error signals are supplied to an interrupter circuit which stops the motion of the rotating part.

Further advantageous embodiments and developments of the invention are the subject of the sub-claims and are disclosed therein.

Preferred embodiments of the invention are explained hereinbelow in conjunction with the accompanying drawing in which.

The construction and operation of rotary potentiometer with two wiper arms which is particularly suited as angle function generator within the scope of the electronic controller according to the invention will first be explained by reference to FIGS. 1 to 3.

Figure 1:
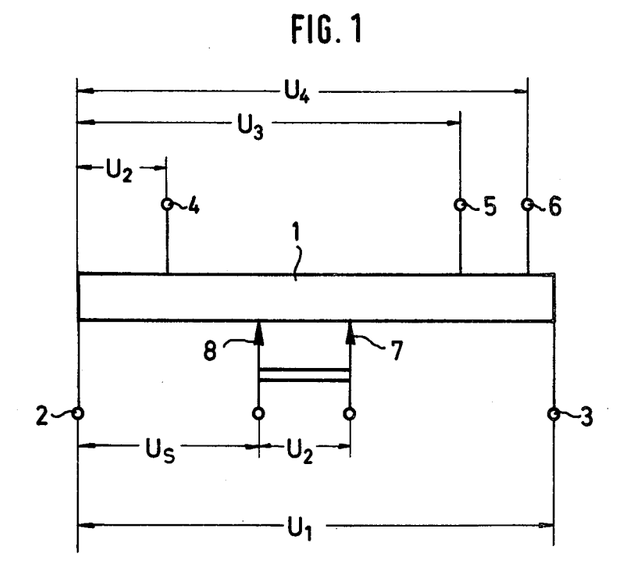
FIG. 1 is a diagrammatic view of a potentiometer, developed into a linear configuration, having two wiper arms.
Figure 2:
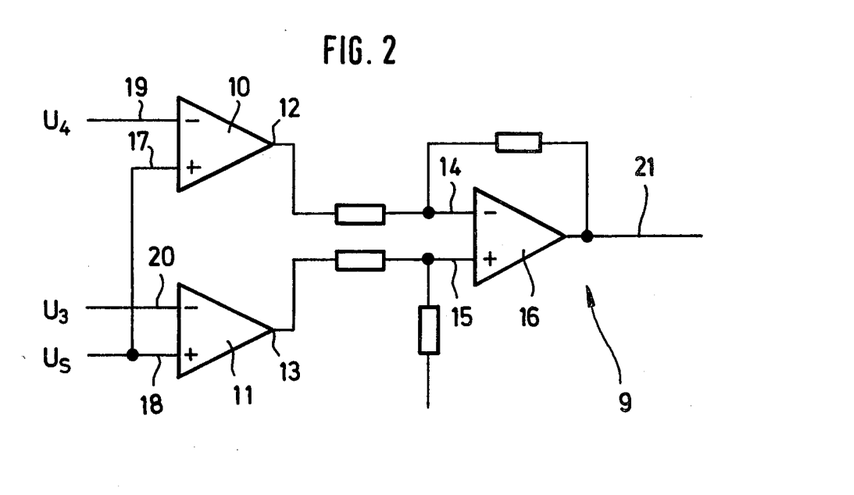
FIG. 2 shows a summing circuit for generating a switching pulse for a switch for alternately picking off the output voltage of the potentiometer from the front and from the rear wiper arm.

FIG. 1 shows the track 1 of the rotary potentiometer in developed form. Normally such a track is re-entrant. An operating voltage $U_1$, which remains constant during the entire operation, is connected via terminals 2 and 3 to the resistor track 1 which consists of electrically conductive material with a very high mechanical resistance. A voltage $U_2$ is appled between the terminal 2 and a first fixed voltage tapping 4, a voltage $U_3$ supplied between the terminal 2 and a second fixed voltage tapping 5 and a voltage $U_4$ is applied between the terminal 2 and a third fixed voltage tapping 6.

A front wiper arm 7 and a rear wiper arm 8 are angularly offset from each other so that a voltage, precisely equal to the voltage $U_2$ between the terminal 2 and the first tapping 4, is established between said wiper arms. The angular distance between the two wiper arms remains constant.

A switching unit 9, illustrated in FIG. 2 and generating a switch control signal for alternately picking off, in a manner to be described subsequently, the voltage applied to the front wiper arm 7 and the voltage applied to the rear wiper arm 8, is provided to generate a potentiometer measuring voltage which rises continuously from zero to a maximum value during a full rotation of the rotary potentiometer and on reach such maximum value drops back in defined manner to the zero value.

The switching unit 9 comprises two comparators 10,11 whose outputs 12 and 13 are connected to the inputs 14,15 of a summing amplifier 16. The voltage between the terminal 2 and the rear wiper arm 8 ($U_S$) is applied to both positive inputs 17 or 18 of the comparators 10 and 11, the voltage $U_4$ is applied to the negative input 19 of the comparator 10 and the voltage $U_3$ is applied to the negative input 20 of the comparator 11.

Figure 3:
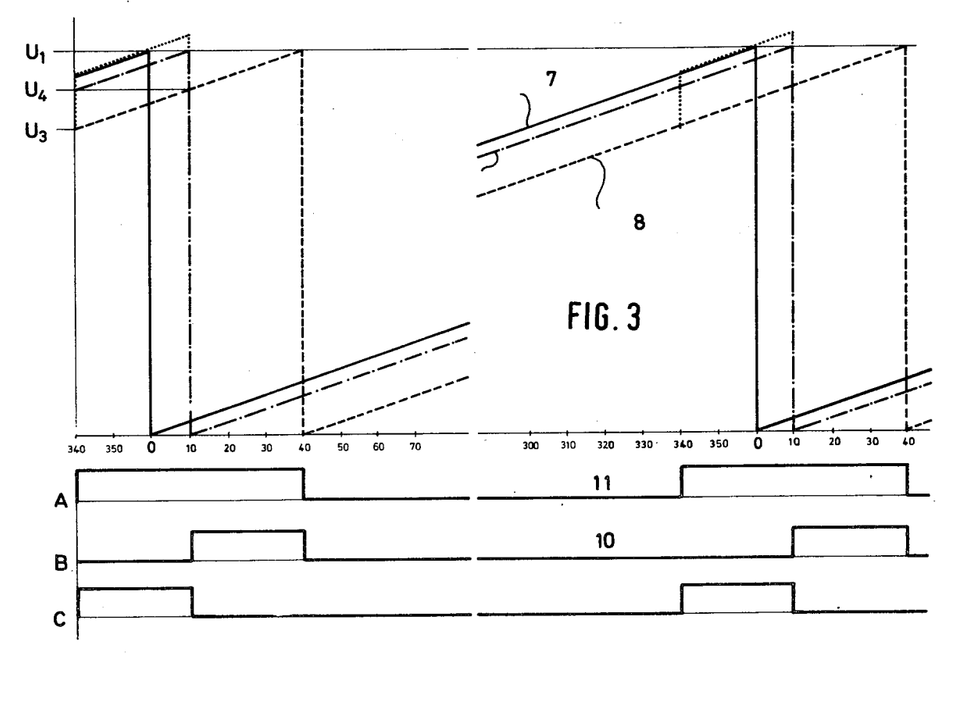
FIG. 3 is a diagrammatic view of the voltages applied to the two wiper arms of the rotary potentiometer and of the output voltage over the entire range of rotation of the potentiometer and of the pulses delivered by the control circuit for alternately picking off the output voltage from the front and rear wiper arm.

The voltage characteristic shown under A in FIG. 3 will be obtained from the output 13 of the comparator 11 as the result of sliding of the two wiper arms 7,8 if the angular position between the two wiper arms is 40° and if the second fixed tapping 5 is situated at an angular position of 300° and the third fixed tapping is situated at an angular position 330°. The voltage between the rear wiper arm 8 and the terminal 2 exceeds the voltage $U_3$ if the angular position of the front wiper arm 7 exceeds 340° so that the output signal of the comparator 11 is triggered. This output signal is swept back into the starting position as soon as the rear wiper arm reaches the 360°-0° transition, i.e. when the front wiper arm 7 is set at an angle of 40°.

In like manner the output signal of the comparator 10 is triggered in the manner illustrated under B in FIG. 3 as soon as the voltage $U_S$ exceeds the voltage $U_4$, i.e. when the front wiper arm 7 is set at an angle of 10°. This comparator is also swept back into the starting position as soon as the rear wiper 8 passes by the 360°-0° transition.

A signal characteristic as illustrated under C in FIG. 3 is obtained at the output 21 of the summing amplifier 16 by virtue of the latter forming a difference between the output signals obtained from the comparators 10 and 11. A signal voltage occurs on the output 21 if the front wiper arm is set at an angle between 340° and 10°.

This signal voltage is used in a manner not shown for alternately picking off the output voltage of the potentiometer from the front wiper arm 7 and from the rear wiper arm 8.

In the explanations which follow references to angles always refer to the position of the front wiper arm 7.

In the absence of an output signal at the output 21 (angular range between 10° and 340°) the output voltage will correspond to the voltage on the front wiper arm 7 (solid line in FIG. 3). When an output signal appears at the output 21 (angular range 340° to 10°) the output voltage will correspond to the voltage $U_S$ on the rear wiper arm 8 to which the constant voltage $U_2$ is added (dotted voltage characteristic). The output voltage of the potentiometer is therefore illustrated by the solid line for the region between 10° and 340° and by the dotted line between 340° and 10°. It will be seen that this voltage does not drop to zero for any angular position. To achieve this effect a constant voltage is subtracted from the output voltage to provide the voltage which will be referred to hereinafter as measuring voltage. The constant voltage which is to be subtracted from the output voltage is selected so that the measuring voltage drops to zero immediately after changeover, i.e. for an angular position of 10°. Rotation of the potentiometer therefore results in a measuring voltage which rises linearly from zero to the maximum value. The essential feature is that the step response from maximum value to minimum value is sharply defined because such step response is triggered by operation of the comparator 10. This is achieved by the rear wiper 8 which will then still be situated at a safe distance from the undefined end region of the resistor track. FIG. 3 shows the voltage on the rear wiper arm 8 in broken lines and the measuring voltage in dotted lines. The use of the rotary potentiometer described above therefore enables an analogous measuring voltage to be generated which is precisely proportional to the angular position of the rotating part over the entire range thereof. This measuring voltage is utilized within the scope of the present invention to generate control signals at specific angular positions in order to trigger specific operations etc.

Figure 4:
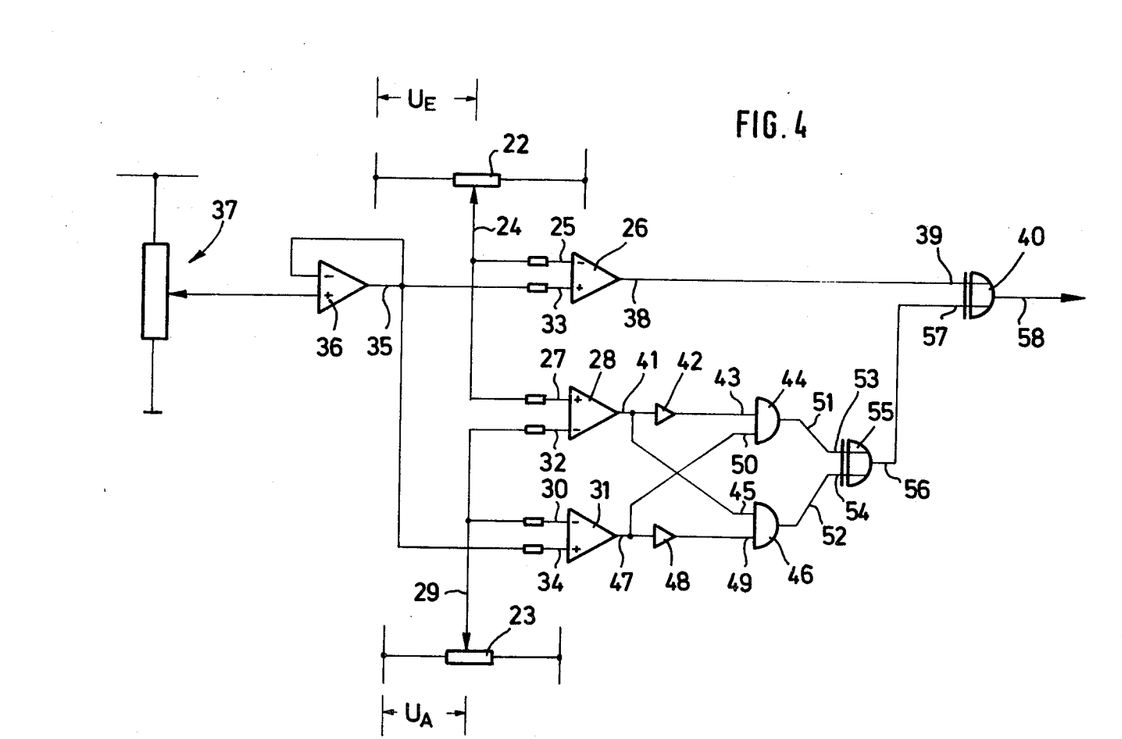
FIG. 4 is a control circuit for generating a control signal which depends on the measured voltage delivered by the potentiometer.

FIG. 4 shows a circuit by means of which such a control signal can be generated. The circuit has two variable potentiometers 22 and 23 for generating an adjustable make voltage $U_E$ and for generating an adjustable break voltage $U_A$. The tapping 24 of the potentiometer 22 is connected to one input 25 of a first comparator 26 and to one input 27 of a second comparator 28. The tapping 29 of the potentiometer 23 is connected to one input 30 of a third comparator 31 as well as to the second input 32 of the second comparator 28. The other inputs 33 and 34 of the first comparator 26 and of the third comparator 31 are together connected to the output 35 of a decoupling network 36 through which the inputs 33 and 34 are supplied with the measuring voltage generated by the rotary potentiometer 37 which is connected to the rotating part but shown only diagrammatically in the drawing.

The output 38 of the first comparator is connected to the input 39 of an exclusive OR-network 40. The output of the second comparator 28 is connected via an inverter 42 to one input 43 of a first AND-network 44 and is connected directly to one input 45 of a second AND-network 46. The output 47 of the third comparator 31 is also connected via an inverter 48 to the second input 49 of the second AND-network 46 and is connected directly to the second input 50 of the first AND-network 44. The outputs 51 and 52 of the AND-networks 44 or 46 are connected to the inputs 53 or 54 of a second exclusive OR-network 55 whose output 56 is connected to the second input 57 of the exclusive OR-network 40.

The control circuit described herein produces the desired control signal at the output 58 of the exclusive OR-network 40.

The method of operation of the control circuit will be explained hereinbelow. A positive signal at the output of one of the logic circuit elements contained in the circuit will hereinafter be designated 1 and a negative signal will be designated 0.

A 1 appears at the output of the comparator 26 if the measuring voltage is greater than the make voltage $U_E$ which is connected to the potentiometer 22 and a 0 will appear at the output 38 if the measuring voltage is below $U_E$. The same applies to the output 47 of the comparator 31 as regards the break voltage $U_A$ which is connected to the potentiometer 23.

A 0 will appear at the output 41 of the comparator 28 if the break voltage $U_A$ is greater than the make voltage $U_E$. This is always the case if the make and break times occur between 0° and 360°. If the make time occurs before 360° is reached but the break time occurs thereafter the make voltage $U_E$ will be greater than the break voltage $U_A$; a 1 will then appear at the output 41 of the comparator 28.

The same signal that appears at the output 47 of the comparator appears at the output 56 of the exclusive OR-network 55 if the output signal of the comparator 28 is 0, as is readily evident by the logic functions of the inverters 42 and 48 of the AND-networks 44 and 46 and of the exclusive OR-network 55. If this output signal is 1 the signal appearing at the output 56 of the exclusive OR-network 55 will be inverted with respect to the signal appearing at the output 47 of the comparator 31.

In the event that the break voltage is greater than the make voltage (comparator 28 supplies 0) a control signal will always appear at the output 58 of the exclusive OR-network 40 if the measuring voltage is between the make voltage $U_E$ and the break voltage $U_A$.

If the break voltage $U_A$ is smaller than the make voltage $U_D$ the output 58 will provide a control signal whenever the measuring voltage is not between the make voltage and the break voltage but only if the measuring voltage is either above the make voltage or below the break voltage.

This control circuit therefore achieves the continuous generation of a control signal which commences when the measuring voltages reaches the make voltage and terminates when the measuring voltage reaches the break voltage irrespective of whether a step response of the measuring voltage occurs for the duration of the control signal. It is therefore possible to generate a control pulse of any desired length and phase by means of one and the same control circuit.

Different monitoring circuits are provided for the individual components of the control to ensure reliable operation of the electronic controller described herein.

The simple construction of the switching device associated with the rotary potentiometer for alternately picking off the potentiometer output voltages from both wiper arms thereof and the likewise simple construction of the control circuit illustrated in FIG. 4 enables these circuits to be provided in duplex configuration for checking purposes. The output signals thus generated, namely the control signal which occurs on switchover and is shown under C in FIG. 3 and the control signal which appears at the output 58 of the control circuit, are always compared with the same signal of the parallel circuit. An error signal is generated in a manner not shown if deviations occur.

Figure 5:
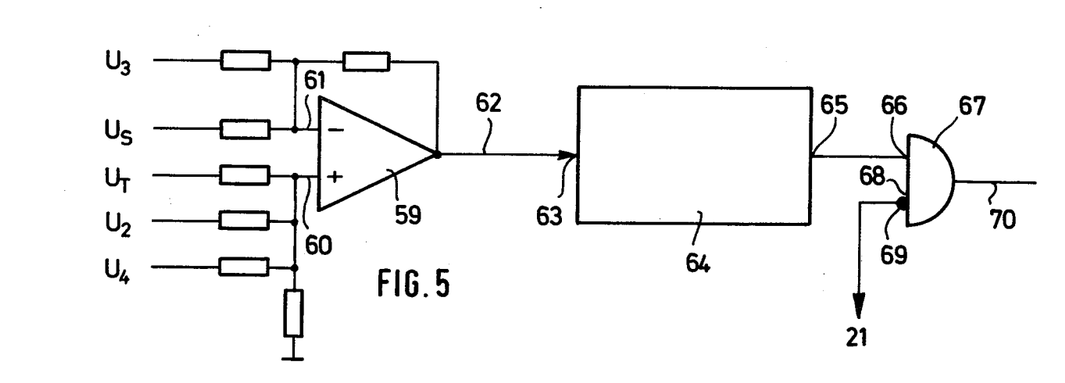
FIG. 5 is a monitoring circuit for monitoring the potentiometer operation while the output voltage is picked off from the front wiper arm.
Figure 6:
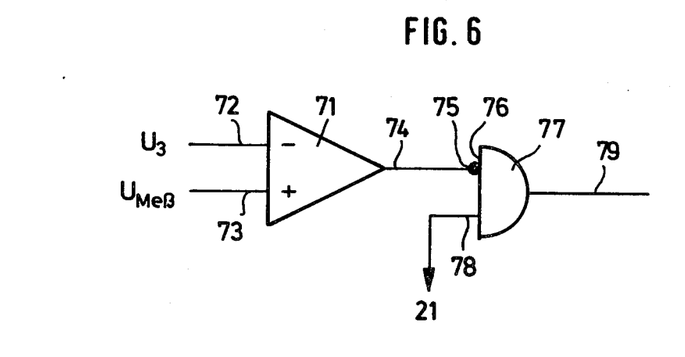
FIG. 6 shows a monitoring circuit for monitoring the potentiometer operation while the output voltage is picked off from the rear wiper arm.

The circuits illustrated in FIGS. 5 and 6 are suitable for monitoring the operation of the two-armed rotary potentiometer itself.

The circuit of FIG. 5 incorporates a summing amplifier 59 whose positive input 60 carries a summated voltage comprising the voltage $U_4$, $U_2$ and the voltage $U_T$ between the terminal 2 and the front wiper arm 7 and whose negative input 61 carries a second summated voltage comprising the voltages $U_3$ and $U_S$. The summated voltage $U_E$ at the output 62 of the summing amplifier 59 comprises the sum of the voltages between the terminal 2 and the first fixed tapping 4, the rear wiper arm 8 and the front wiper arm 7 and the second tapping 5 and the third tapping 6. This summated voltage $U_D$ is applied to the input 63 of a window discriminator 64 of known construction whose output 65 carries a signal only if the summated voltage $U_D$ deviates from a fixed voltage in the positive or negative direction by a specific amount. The output 65 is connected to the input 66 of an AND-network 67 whose second input 68 is connected via an inverter 69 in a manner not shown to the output 21 of the switching means illustrated in FIG. 2.

The summated voltage $U_D$ monitors the operation of the rotary potentiometer. In the event of failure of any operation of the said potentiometer the voltage $U_D$ will change so that a signal appears at the output 65 of the window discriminator 64. If no signal is generated at the output 21 of the switching means a 1 will be applied to the input 68 of the AND-network 67 so that an error signal is generated at the output 70 of the AND-network if the output 65 of the window discriminator 64 also carries a 1. However, the AND-network 67 does not allow an error signal to pass if a control signal is supplied to the output 21 of the switching means. The monitoring circuit of FIG. 5 is therefore effective only in the range in which the output voltage is picked off from the front wiper 7, i.e. in an angular position between 10° and 340° in the illustrated example.

The remainder of the range can be monitored by means of the monitoring circuit illustrated in FIG. 6. This comprises a comparator 71 whose first input 72 carries the voltage $U_3$ and whose second input 73 carries the measuring voltage $U_{MeB}$. The output 74 of the comparator 71 is connected via an inverter 75 to the input 76 of an AND-network 77 whose second input 78 is connected in like manner to the output 21 as in the case of the AND-network 67 of FIG. 5.

If the measuring voltage is greater than the voltage $U_3$ the output 74 will carry a 1 and a 0 will appear at the input 76 of the AND-network 77 owing to the presence of the inverter 75. Accordingly, no error signal appears at the output 79 of the AND-network 77. However, if the measuring voltage is below the voltage $U_3$ a 1 will appear at the input 76 of the AND-network 77. If a 1 is also applied to the input 78 an error signal will appear at the output 79. This is the case if the switching means of FIG. 2 generate an output signal, i.e. if the output voltage is picked off from the rear wiper 8 (between 340° and 10°). The monitoring circuit of FIG. 6 therefore checks whether the measuring voltage over the entire switching range is above the voltage $U_3$. It therefore also checks whether changeover switching from the front wiper 7 to the rear wiper 8 has taken place because after the transition the front wiper 7 will have only a very low voltage so that the measuring voltage derived therefrom would be below $U_3$.

In their entirety the monitoring circuits illustrated in FIGS. 5 and 6 therefore monitor the operation of the rotary potentiometer described herein over its entire range of rotation.

A further check is necessary to ensure reliable rotary connection between the rotating part and the rotary potentiometer. This can be achieved in a simple manner if at least one counting pulse is supplied by the rotary potentiometer for each rotation to a counter and an identical number of reset pulses is supplied for each rotation of the part by a pulse transmitter which is associated with said rotating part. If the rotary connection is in order the counter will receive the same number of counting and reset pulses for each rotation. However, if the rotary connection is faulty the number of counting pulses and rotation pulses will deviate from each other. In such a case the counter will generate an error signal.

To check correct operation of the device which generates the reset pulses it is possible to provide an additional counter to which the reset pulses are supplied in the form of counting pulses and the counting pulses of the rotary potentiometer are supplied as reset pulses. If the pulse transmitter associated with the rotating part operates incorrectly the above-mentioned counter will deliver an error signal.

To ensure that the monitoring circuits illustrated in FIGS. 5 and 6 function reliably they can be embodied in duplex configuration and can be compared with each other. An error signal will be generated in the event of a deviation occurring.

Finally, to monitor the line which transmits the measured signal to the control circuit it is possible to apply to such a line a specific base voltage, for example of 1 V, which is tested by a detector circuit associated with the corresponding control circuit. This voltage is superimposed on the measuring voltage and is subtracted therefrom in the control circuit. The detector voltage will deliver an error signal if it detects failure of the superimposed voltage when the measuring voltage drops to 0.

The error signals generated in the circuits described herein are supplied to an interrupter circuit which immediately interrupts the drive for the rotating part if a single error signal occurs. Such interrupter circuits are known and are therefore not described in detail.

By virtue of its embodiment as illustrated the electronic controller described hereinabove is suitable not only for generating control pulses of any desired duratior and phase but it is self-testing for all its functions so as to ensure completely reliable operation.

Figure 7:
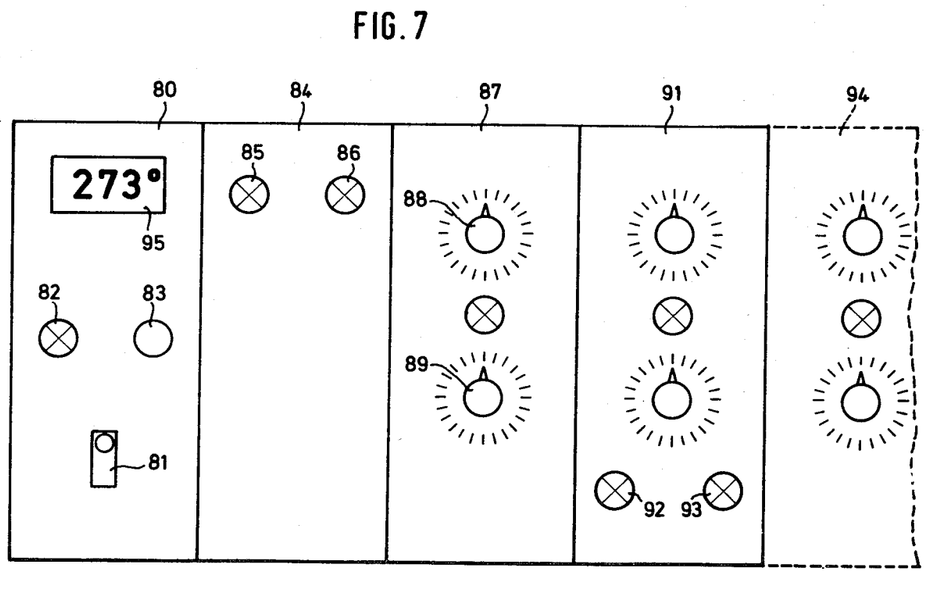
FIG. 7 is a diagrammatic front view of a complete controller according to the invention.

FIG. 7 shows a practical embodiment of such as electronic controller.

A first chassis 80 with an ON-OFF switch 81, a signal lamp 82 and a fuse casing 83 also houses the switching means for the rotary potentiometer, i.e. the circuit which controls voltage pick-off from the rotary potentiometer and generates the measuring voltage. In the second chassis are disposed the error circuit illustrated in FIGS. 5 and 6, which said circuit is duplicated in the manner described where appropriate. Signal lamps 86 and 85 indicate reliable operation or a fault.

A third chassis 87 accommodates a control circuit for generating a control pulse. The make potentiometer 22 of the control circuit illustrated in FIG. 4 can be set by means of a first actuating knob 88 and the break potentiometer 23 can be set by means of a second actuating knob 89. A signal lamp 90 indicates the presence of a control signal. The chassis 91 is of substantially identical construction as that of the chassis 87 but the control circuit is duplicated in the manner already described. An error circuit which compares the output signals of the control circuits indicates by means of two signal lamps 92,93 whether the control circuit operates reliably. Furthermore, where appropriate it also transmits an error signal to the interrupter circuit.

The chassis 80 and 94 can be followed by any desired number of separate control circuits which are either of single-channel configuration as in the chassis 87 or double-channel configuration as in the chassis 91. FIG. 7 shows that a two-channel chassis 91 is followed by a further single-channel chassis 94 whose construction is identical to that of the chassis 87.

To monitor the angular position of the rotating part the chassis 80 also contains an indicating device 95 which is directly driven by the measuring voltage. The illustrated indicating instrument is a digital display instrument calibrated to an angular range of 360° but analog display instruments can also be employed.

To ensure reliably that the error circuits interrupt the motion of the rotating part even if the rotary potentiometer is rotated very rapidly and the error signals are therefore very brief, it is possible for the interrupter circuit to be preceded by a memory element which converts even the briefest error pulses into signals to which the interrupter circuit can respond.

I claim:

1. A device for generating electrical control signals comprising:
   a potentiometer having variable electrical resistance, at least one input terminal, a plurality of output terminals and a plurality of arms in spaced relation;
   a source of operating voltage connected to said input terminal;
   first means connected to said potentiometer for varying the resistance of said potentiometer and providing a first signal at one of said output terminals which varies in response to the resistance of said potentiometer;
   first supply means for providing a second signal for comparison with said first signal;
   second supply means for providing a third signal for comparison with said first and second signals; and,
   second means for comparing said first, second and third signals and for providing a control signal having a magnitude dependent on an instantaneous relationship of said first, second and third signals.

2. A device as set forth in claim 1 wherein said potentiometer is a rotary potentiometer having said arms rotatable in spaced angular relation.

3. A device as set forth in claim 2 wherein said rotary potentiometer comprises a resistance track with each end thereof adjacent each other, a transition region defined as the area of said track surrounding the ends, a front and a rear arm set at a fixed angular spacing from each other; and, said first means comprises a changeover means connected to said front arm and said rear arm for receiving a signal from said potentiometer and for providing a changeover output signal, said changeover output signal comprising the combination of a front arm output signal received from said front arm while said front arm is situated at a distance from said transition region of said potentiometer and a composite signal received when said front arm is situated within a distance near said transition region of said potentiometer and said composite signal is formed by adding a rear arm output signal received from the rear arm to a supplementary signal corresponding to the fixed differential of the signals received from said front and rear arms when said front arm is situated at a distance from and in front of said transition region.

4. A device as set forth in claim 3 wherein said first means further comprises a subtraction means for providing a constant signal and subtracting said constant signal from said changeover output signal received from said changeover means to form said first signal.

5. A device as set forth in claim 3 wherein said rotary potentiometer further comprises:
   a first fixed tapping on said resistance track located at an angle of rotation from zero, where zero is located at a first end of said resistance track and within said transition region of said potentiometer, corresponding to the fixed angular spacing between said front and rear arms whereby said supplemental signal is received therefrom;
   a third fixed tapping situated on said resistance track close to and in front of a second end of said resistance track at the full angle of rotation of 360° from zero; and,
   a second fixed tapping situated on said resistance track between said first and third tappings and at an angular displacement from said third tapping which is less than the angular spacing between said front and rear arms.

6. A device as set forth in claim 5 wherein said changeover mens switches from providing the front arm output signal as said changeover output signal to providing said changeover output signal formed by adding said rear arm output signal and said supplementary signal when said rear arm engages said second tapping and said changeover means switches back to providing said front arm output signal as said changeover output signal when said rear arm engages said third tapping, and said front arm rotates through said transition region of said rotary potentiometer during the time said rear arm passes between said second and third tappings.

7. A device as set forth in claim 6 wherein said changeover means comprises a first comparator means, a second comparator means and a first summing amplifier; said first comparator means having a first input connected to and receiving information from said third tapping and a second input receiving said rear arm output; said first comparator means forming a signal having a magnitude dependent upon an instantaneous relationship of said rear arm output and the information received from said third tapping; said second comparator means having a first input connected to and receiving information from said second tapping and a second input receiving said rear arm output; said second comparator means forming a signal having a magnitude dependent upon an instantaneous relationship of said rear arm output and the information received from said second tapping; said first summing amplifier having a first input for receiving the signal from said first comparator means and a second input for receiving the signal from said second comparator means; said first summing amplifier forming a switch control signal which represents the difference between said signals from said first and second comparator means.

8. A device as set forth in claim 7 further comprising a monitoring means connected to said potentiometer for monitoring the electrical signals and mechanical connections of said rotary potentiometer and generating a monitor error signal when a deviation from a predetermined signal value is detected.

9. A device as set forth in claim 8 wherein said monitoring means comprises a first monitoring circuit for monitoring the electrical signals from said rotary potentiometer comprising:

a second summing amplifier having a first input receiving a first summated signal comprising the information from said second tapping and said rear arm output signal and a second input receiving a second summated signal comprising said front arm output signal and the information from said respective first and third tappings, and said second summing amplifier forming a third summated signal comprising the sum of said first and second summated signals;

a window discriminator means for receiving said third summated signal from said second summing amplifier, detecting any deviation of said third summated signal value from a predetermined signal value, and providing an error signal in the event of a defined deviation of said third summated signal from said predetermined signal value; and,     a first selector circuit means for receiving said error signal from said window discriminator means and suppressing said error signal received for as long as said changeover output signal is said composite signal.

10. A device as set forth in claim 9 wherein said first selector circuit means comprises an AND-circuit element having a first input for receiving said error signal from said window discriminator means and a second input connected to an inverter circuit, said inverter receiving said switch control signal from said first summing amplifier.

11. A device as set forth in claim 9 wherein said first monitoring means further comprises:

a third comparator means having a first input for receiving said first signal and a second input for receiving the information from said second tapping and said third comparator means providing an error signal output when said first signal compares with the information from said second tapping in a predetermined manner; and,     a second selector circuit means for receiving said error signal from said third comparator means and suppressing said error signal received for as long as said changeover output signal is said front arm output signal.

12. A device as set forth in claim 11 wherein said second selector circuit means comprises an AND-circuit element having a first input for receiving said switch control signal from said first summing amplifier and a second input connected to an inverter circuit, said inverter receiving said error signal from said third comparator means.

13. A device as set forth in claim 8 wherein said monitoring means comprises a second monitoring circuit for monitoring the mechanical connection between said potentiometer and said arms comprising:

a pulse generator means for providing at least one counting pulse for each rotation of said arms;

a pulse transmitter means associated with said rotating arms for supplying an equal number of reset pulses for each rotation of said arms as said pulse generator means provides counting pulses for each rotation; and,     a comparator means receiving said counting pulses and said reset pulses for providing an error signal in the event of any deviation between the number of counting pulses and reset pulses.

14. A device as set forth in claim 8 further comprising an indicator means for displaying said first signal.

15. A device as set forth in claim 14 wherein said indicator means comprises a digital display calibrated to an angle of 360°.

16. A device as set forth in claim 7 wherein said device comprises two identical changeover means and an error indicator means for providing a changeover error signal in the event of any deviation in the respective switch control signals from said identical changeover means.

17. A device as set forth in claim 16 further comprising an interrupter means for receiving said changeover error signal and stopping the rotation of said arms of said potentiometer if said changeover error signal is received.

18. A device as set forth in claim 8 wherein said device comprises two identical monitoring means and a monitoring error indicator means for providing an override error signal in the event of any deviation in the respective error signals from said identical monitoring means.

19. A device as set forth in claim 18 further comprising an interrupter means for receiving said override error signal and stopping the rotation of said arms of said potentiometer if said override error signal is received.

20. A device for generating electrical control signals comprising:

a potentiometer having variable electrical resistance, at least one input terminal, a plurality of output terminals and a plurality of arms in spaced relation;

a source of operating voltage connected to said input terminal;

first means connected to said potentiometer for varying the resistance of said potentiometer and providing a first signal at one of said output terminals which varies in response to the resistance of said potentiometer;

first supply means for providing a second signal for comparison with said first signal;

second supply means for providing a third signal for comparison with said first and second signals; and,     second means for comparing said first, second and third signals and for providing a control signal having a magnitude dependent on an instantaneous relationship of said first, second, and third signals comprising:

a first comparator circuit for comparing said first signal with said second signal and forming a first resultant signal dependent on the relationship of said first and second signals;

a second comparator circuit for comparing said second signal with said third signal and forming a second resultant signal dependent on the relationship of said second and third signals;

a third comparator circuit for comparing said first signal with said third signal and forming a third resultant signal dependent on the relationship of said first and third signals; and,         a logic circuit for receiving said resultant signals from said first. second and third comparator circuits and providing said control signal having a magnitude dependent on an instantaneous relationship of said first, second and third resultant signals.

21. A device as set forth in claim 20 wherein said first signal is a measuring signal, said second signal is a make signal, and said third signal is a break signal.

22. A device as set forth in claim 21 wherein said control signal has a first predetermined magnitude whenever said measuring signal compares in a first predetermined manner to said make signal and a second predetermined magnitude whenever said measuring signal compares in a second predetermined manner to said break signal.

23. A device as set forth in claim 22 further comprising:
   means for altering the magnitude of said make signal such that the occurrence of a make point, defined as the point at which said control signal begins having said first predetermined magnitude, is adjustable as desired; and,
   means for altering the magnitude of said break signal such that the occurrence of said break point, defined as the point at which said control signal begins having said second predetermined magnitude, is adjustable as desired.

24. A device as set forth in claim 21 wherein said logic circuit means comprises an exclusive OR-circuit having a first input receiving said third resultant signal from said third comparator means and a second input connected to a logic switching means responsive to said make, break and third resultant signals and having an output signal; said output signal is said third resultant signal if said make signal is smaller than said break signal and said output signal is an inverted third resultant signal if said make signal is greater than said break signal; said output signal of said logic switching means is connected to said second input of said logic circuit.

25. A device as set forth in claim 24 wherein said logic switching means comprises first and second AND-circuits and a second exclusive OR-circuit; said third resultant signal from said third comparator means is directly connected to a first input of said first AND-circuit and is connected to a first inverter circuit having an output connected to a first input of said second AND-circuit; said second resultant signal from said second comparator means is directly connected to a second input of said second AND-circuit and is connected to a second inverter circuit having an output connected to a second input of said first AND-circuit; said first AND-circuit provides a fourth resultant output which is directly received by a first input of said second exclusive OR-circuit and said second AND-circuit provides a fifth resultant output which is directly received by a second input of said second exclusive OR-circuit.

26. A device as set forth in claim 21 wherein said logic circuit means comprises an exclusive OR-element having a first input receiving said third resultant signal from said third comparator means and a second input connected to a logic switching means responsive to said make, break and third resultant signals and having an output signal; said output signal is said third resultant signal if said make signal is smaller than said break signal and said output signal is an inverted third resultant signal if said make signal is greater than said break signal; said output signal of said logic switching means is connected to said second input of said logic circuit.

27. A device as set forth in claim 26 wherein said logic switching means comprises first and second AND-circuits and a second exclusive OR-circuit; said third resultant signal from said third comparator means is directly connected to a first input of said first AND-circuit and is connected to a first inverter circuit having an output connected to a first input of said second AND-circuit; said second resultant signal from said second comparator means is directly connected to a second input of said second AND-circuit and is connected to a second inverter circuit having an output connected to a second input of said first AND-circuit; said first AND-circuit provides a fourth resultant output which is directly received by a first input of said second exclusive OR-circuit and said second AND-circuit provides a fifth resultant output which is directly received by a second input of said second exclusive OR-circuit.

28. A device as set forth in claim 20 wherein said device comprises two identical second means and a comparator error indicator means for providing a comparator error signal in the event of any deviation of the respective control signals from said identical second means.

* * * * *